United States Patent [19]

Moriya et al.

[11] 4,115,913

[45] Sep. 26, 1978

[54] METHOD AND APPARATUS FOR WIND LOADING FILM MAGAZINES

[75] Inventors: Ikuro Moriya; Masao Tsuruta, both of Minami-ashigara, Japan

[73] Assignee: Fuji Photo Film Co., Ltd., Minami-ashigara, Japan

[21] Appl. No.: 795,267

[22] Filed: May 9, 1977

[30] Foreign Application Priority Data

May 10, 1976 [JP] Japan ................................ 51-52991

[51] Int. Cl.2 ........................ B23P 19/02; B23P 21/00

[52] U.S. Cl. ........................................ 29/450; 29/430; 29/431; 29/773; 29/789; 29/806; 53/118

[58] Field of Search ................. 29/429, 430, 431, 791, 29/797, 799, 806, 773, 782, 784, 789, 450; 242/71.1; 53/21 FW, 118, 169

[56] References Cited

U.S. PATENT DOCUMENTS

| | | | |
|---|---|---|---|
| 2,176,507 | 10/1939 | Nagel | 242/71.1 |
| 2,519,753 | 8/1950 | Goodhand | 242/71.1 |
| 2,940,232 | 6/1960 | Wallace et al. | 53/112 R |
| 2,951,656 | 9/1960 | Wellman | 242/71.1 |
| 3,457,627 | 7/1969 | Napor et al. | 29/806 |
| 3,480,226 | 11/1969 | Roman | 242/71.1 |
| 3,586,258 | 6/1971 | Horlezeder | 242/71.1 |
| 3,742,586 | 7/1973 | Butler | 29/806 |
| 3,787,954 | 1/1974 | Gade et al. | 29/430 |
| 3,921,278 | 11/1975 | Basu | 29/806 |
| 3,930,296 | 1/1976 | Hoover | 29/806 |

*Primary Examiner*—C.W. Lanham
*Assistant Examiner*—Daniel C. Crane
*Attorney, Agent, or Firm*—Sughrue, Rothwell, Mion, Zinn and Macpeak

[57] ABSTRACT

A precut strip of 35 mm. photographic film 5 is wound onto a magazine spool 3 by inserting the leading end of the film strip into an aligned spool slot **3*a*, rotating the spool to wind the film strip thereon, enclosing the wound spool with an open slotted cylindrical cover or shell 4, pinch or squeeze closing the cover slot, and placing caps 1, 2 over the open ends of the cover. A plurality of apparatusses 7 for automatically implementing the above steps are mounted at spaced positions on a continuously moving endless conveyor 6** disposed adjacent a plurality of stationary cams which controllingly engage followers on the apparatusses during the conveyor movement, and all of the work operations are performed on the same moving spool shaft axes, whereby greatly increased production speeds are possible.

4 Claims, 4 Drawing Figures

METHOD AND APPARATUS FOR WIND LOADING FILM MAGAZINES

BACKGROUND OF THE INVENTION

1. Field of the Invention

The present invention relates to a method and apparatus for wind loading a strip of 35 mm. photographic film into a cylindrical magazine simultaneously with the assembly of the magazine components.

2. Description of the Prior Art

U.S. Pat. No. 2,940,232, exemplifying the prior art, discloses a film winding apparatus employing an intermittently rotated turntable having a spool supply station, an end cap supply station, and a cover supply station, said spool, caps and cover being assembled into a cylindrical film magazine, a film winding station for loading a film strip onto a spool, and a capping station for inserting the wound spool into the cover and capping its ends. The work movement is thus temporarily stopped at each of said stations, and during such stoppage the loading and assembly steps are independently carried out.

In such an apparatus precise control is required to accurately feed or supply the magazine components at the respective turntable stops in a short period of time at each station, and it is difficult to increase the rotational speed of the turntable and apparatus to thereby increase the production rate without adversely affecting the necessary control accuracy.

SUMMARY OF THE INVENTION

The present invention eliminates these disadvantages by providing a method and apparatus for continuous film winding simultaneously with the assembly of the film magazines. In the present invention the end caps, film spool, and a shell or cover, which are assembled to form a magazine, are manipulated on the same axis before, during, and after their assembly, the following steps being sequentially carried out while continuously conveying said parts, (a) inserting the leading end of a precut film strip into a slot in the spool,
(b) rotating the spool to wind the film strip thereon,
(c) enclosing the wound film spool with a cylindrical, open-slotted cover,
(d) squeeze engaging the cover to close its slot, and
(e) placing caps over the open ends of the cover to complete the magazine assembly.

DETAILED DESCRIPTION OF THE PREFERRED EMBODIMENT

Figure 1:
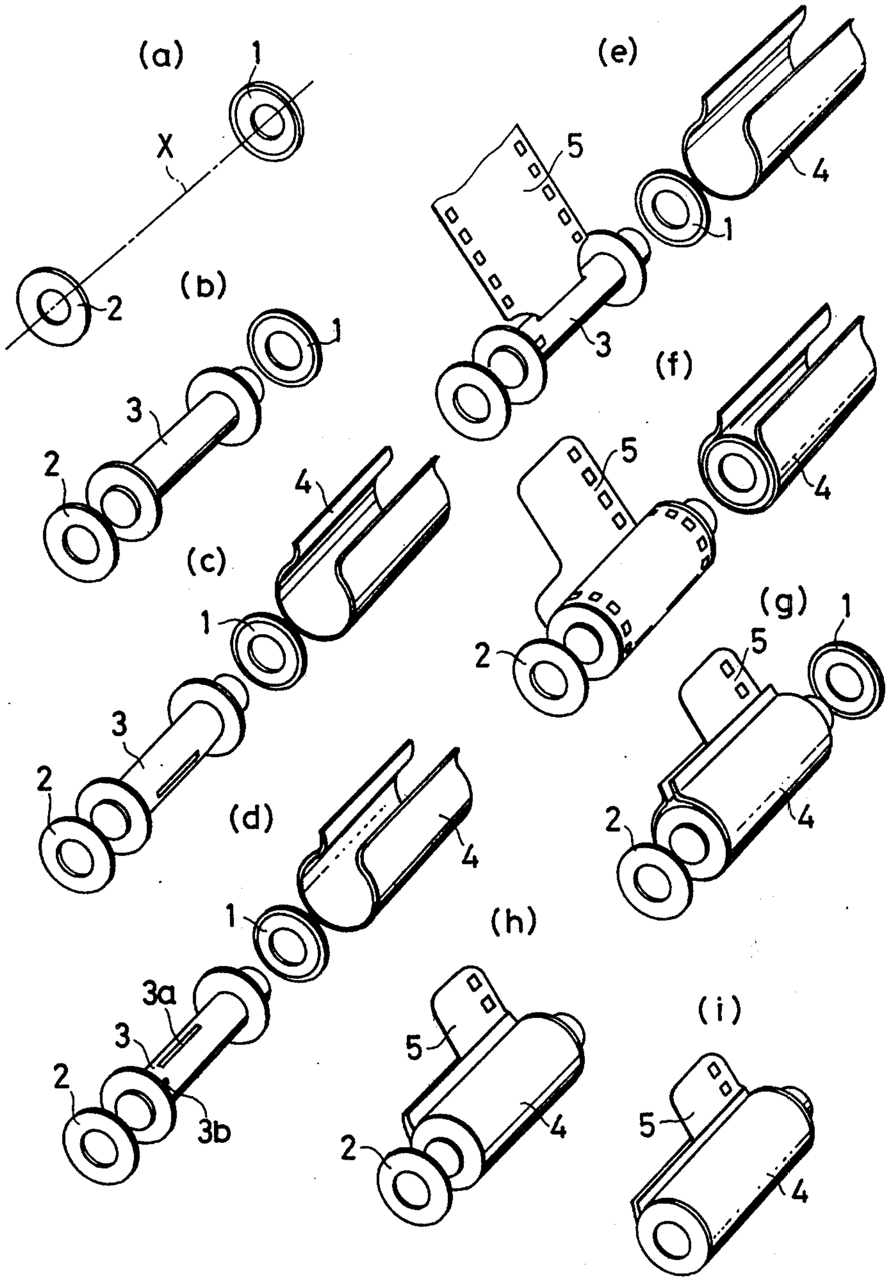
FIGS. 1(*a*)–(*i*) show perspective views of the sequential process steps implemented by a film winding apparatus according to the present invention.

Referring to the sequential process steps illustrated in FIG. 1, reference numerals 1 and 2 designate end caps, 3 is a spool, 4 is a cover, and 5 is a film strip. Reference characters (*a*), (*b*), (*c*) . . . (*i*) designate the respective steps performed in the work flow direction, and center axis X indicated by phantom line designates the winding axis in an apparatus described later. The overall process comprises the steps of: (*a*) supplying caps 1,2 to the X-axis, (*b*) supplying a spool 3 to the X-axis, (*c*) supplying an open cover 4 to the X-axis, (*d*) rotationally positioning the spool film slot 3*a*, (*e*) inserting the end of the film strip 5 in the slot 3*a*, (*f*) winding the film strip 5 onto the spool 3, (*g*) enclosing the wound film roll with the cover 4, (*h*) securing the end caps, and (*i*) removing the loaded film magazine.

Figure 2:
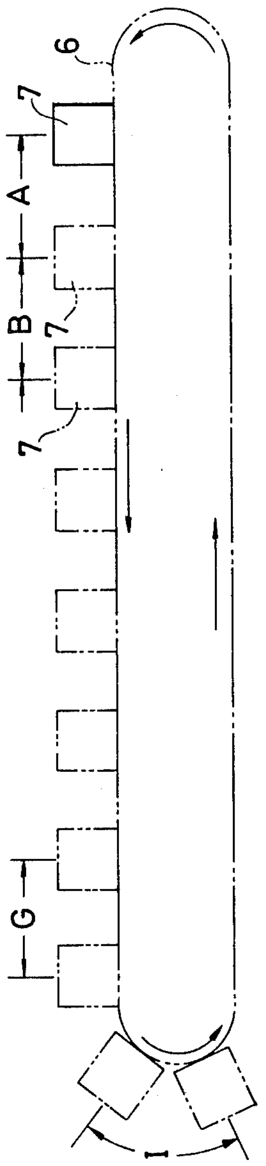
FIG. 2 shows a schematic side view of the moving apparatus.

In the schematic side view of the apparatus shown in FIG. 2, an endless conveyor 6 is continuously driven by drive means (not shown) in the direction indicated by the arrows at a constant speed, and a plurality of film winding units 7 (described later) are mounted on the conveyor 6 at equal spacings. Reference characters A, B . . . I designate the length of movement of the units 7 during the performance or implementation of each of the aforementioned steps (*a*), (*b*) . . . (*i*) schematically shown in FIG. 1.

Figure 3:
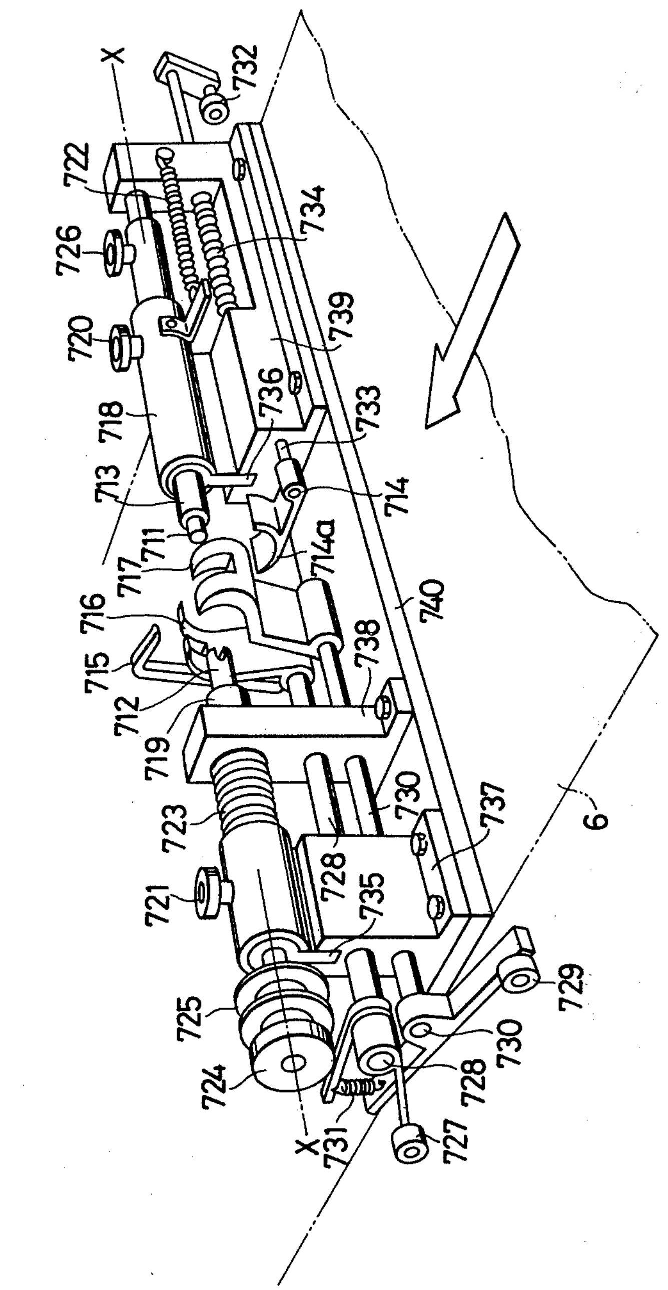
FIG. 3 shows a perspective view illustrating the principal parts of the apparatus.

FIG. 3 shows a perspective view of a winding unit 7, wherein reference numeral 711 designates a rotary shaft for supporting an end cap 1 and one end of a spool 3; 712 is a winding shaft for supporting an end cap 2 and for urging the other end of the spool 3 towards the shaft 711 to support and rotate the spool; 713 is a capper for supporting a cover 4 and pressing the cap 1; 714 is a feeder for attaching the cover 4 to the capper 713; 715 is pawl for locating the spool 3 in the central direction of the X-axis by means of a lever (not shown); 716 and 717 are chucks for pressing the outer peripheral surface of the cover 4 to form it into a desired configuration; 718 is a pusher for inserting the cover 4 between the chucks 716 and 717; 719 is a capper for locking the caps to the opposite ends of the cover 4; 720 and 721 are cam rollers for moving the pusher 718 and capper 719 towards the central portion of the unit 7; 722 and 723 are springs for returning the pusher 718 and capper 719; 724 is a cam roller for rotating the winding shaft 712; 725 is a cam roller fixedly mounted on the cam roller 724 for moving the winding shaft 712 in the direction of the X-axis to thereby hold and release the spool 3; 726 is a cam roller for moving the pusher 713 towards the central portion of the unit 7 (to the left in FIG. 3); 727 is a cam roller for opening and closing the chuck 716 via a shaft 728; 729 is a cam roller for similarly opening and closing the chuck 717 via a shaft 730; 731 is a spring for biasing the cam rollers 727 and 729 towards the surface of the conveyor 6 to thereby normally release the chucks 716 and 717; 732 is a cam roller for rotating the feeder 714 in the direction of the capper 713 via a shaft 733; 734 is a spring for biasing the cam roller 732 towards the surface of the conveyor 6; 735 and 736 are guide members; and 737, 738 and 739 are machinery pedestals mounted on a plate 740.

The units 7 constructed as above are secured to the conveyor 6 as previously mentioned, and are disposed equally spaced apart in the direction of movement of the conveyor. Cams (not shown) for driving the various cam rollers mounted on the units 7 are disposed at predetermined positions in the direction of movement of the conveyor.

The step-by-step operation of the apparatus will now be described. In step (*a*), end caps 1 and 2 are supplied to the units 7. The caps 1 and 2 are stacked in rows in a predetermined direction within a feeder mechanism (not shown), and are removed one by one by a robot hand or the like, the cap 1 being attached to the rotary shaft 711 in the unit 7 and the cap 2 being attached to the winding shaft 712. The operation of attaching the caps to the respective shafts is completed during the continuous movement of the units 7 over the distance A shown in FIG. 2.

In step (*b*) the spool 3 is supplied to the unit 7. The spool is removed by supply means, such as a robot hand, similar to the supply of the end caps, and placed in a position where the center of the spool is registered or aligned with the X-axis between the rotational axes of the shafts 711, 712. The cam roller 725 engages a cam (not shown) positioned in the direction of movement of the conveyor 6, and as a result the roller moves to the right in FIG. 3 whereby the winding shaft 712 moves toward the rotary shaft 711 along the X-axis to thereby engage the ends of the spool 3. In this manner, the spool 3 is supported at its opposite ends by the shafts 711 and 712.

In step (*c*) the cover 4 is supplied to the unit 7. The cover is preformed in a separate process so that its diameter is greater than that of a final magazine after the caps 1 and 2 have been assembled on the opposite ends thereof, whereby the cover is initially open and has a generally cylindrical configuration. The cover is enlarged in diameter to facilitate attaching it to the capper 713 and sliding it over the wound spool 3, as will be described later in step (*g*). In the feeder 714, a troughlike cover receiving member 714*a* is provided parallel to the X-axis as shown in FIG. 3, and the cover is initially placed within this receiving member. Thereafter, as the units 7 move with the conveyor the cam roller 732 engages and follows a cam (not shown), which rotates the feeder 714 clockwise in FIG. 3 through the shaft 733, whereby the cover 4 within the receiving member 714*a* is placed over the capper 713 from the open side thereof and supported thereby. The cam roller 732 subsequently becomes disengaged from its cam and the feeder 714 is returned to its original position by the spring 734.

In step (*d*) the film slot 3*a* in the spool 3 is properly aligned in preparation for inserting the leading and of the film strip 5 into the spool in the succeeding step (*e*). When the unit 7 reaches the position for step (*d*) a lever (not shown) is actuated to cause the pawl 715 to move toward the spool 3, whereby the end of the pawl contacts the axial peripheral surface of the spool. At this time the cam roller 724 slidingly contacts a cam (not shown) which causes the winding shaft 712 to slowly rotate. Since the spool 3 rotates as the shaft 712 rotates, the pawl 715 eventually engages a locating notch 3*b* formed in the spool, which holds the spool in a desired rotational position. Once engaged in the notch 3*b*, the pawl 715 is slipped between the cam roller 724 and a cam (not shown) disposed on the conveyor 6 to prevent the spool from being damaged.

Figure 4:
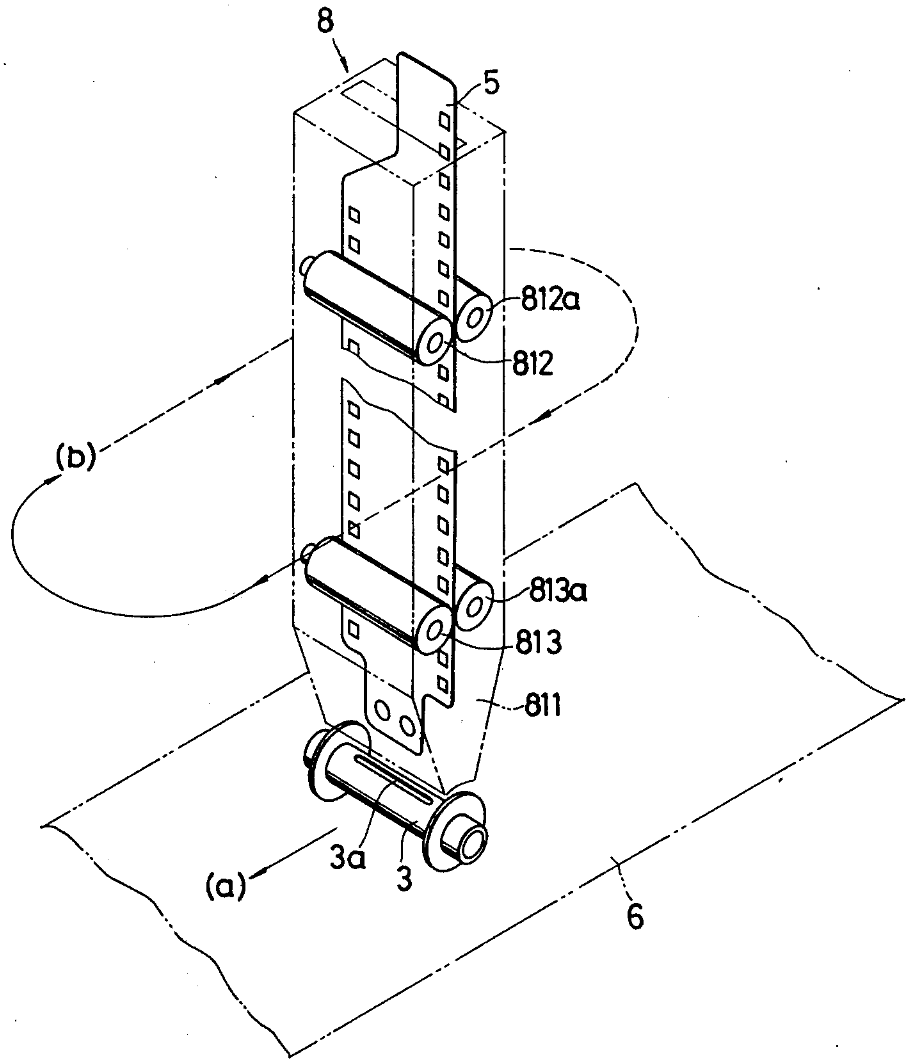
FIG. 4 shows a perspective view of a film supply device.

In step (*e*) the film strip 5 is supplied to the unit 7 by a film supply device 8 shown in FIG. 4. The supply device 8 comprises a guide member 811 for the film strip, guide rollers 812 and 812*a*, and drive rollers 813 and 813*a*. The film supply device moves with the conveyor 6 between steps (*e*) and (*f*), that is until the film strip is enclosed by the cover 4 after being wound on the spool 3, at the same speed as the conveyor and in the direction indicated by arrow (*a*). After the completion of step (*f*) the supply device is returned to its original position along the oval path indicated by arrow (*b*). The film strip 5, which has been cut to the desired shape and length at a separate station, is fed to the film supply device 8, held between the guide rollers and the drive rollers, and advanced to a predetermined position relative to the spool 3. When the guide member 811 becomes registered with the film slot 3*a* in the spool 3, that is when the leading end of the film strip reaches the position whereat it is smoothly insertable into the slot, the drive rollers 813 and 813*a* slowly rotate a desired number of turns to feed out the film strip and lockingly insert its leading end into the slot 3*a*. The drive rollers are then halted and the film strip remains held between the freely rotatable drive rollers and guide rollers.

When the unit 7 enters step (*f*) the pawl 715 becomes disengaged from the spool 3 and the cam roller 724 again comes into engagement with a cam (not shown) which causes the cam roller to rotate. Consequently, the winding shaft 712 and the spool 3 rotate, whereby the film strip 5 is wound onto the spool. When a predetermined length of film is wound onto the spool the cam roller 724 becomes disengaged from the cam. At this point the externally exposed tail or "tongue" end of the film strip remains held between the drive rollers 813 and 813*a*.

In step (*g*) the wound spool 3 is enclosed by the cover 4. When the unit 7 enters step (*g*) the cam roller 720 engages a cam (not shown) which causes the capper 713 to move to the left in the axial direction of the spool. As a result, the cover supported on the capper 713 moves over the cap 1 attached to the shaft 711 toward the spool, and eventually encloses the film strip wound on the spool, as shown in FIG. 1 (*g*). During such movement the cover never contacts the cap 1 or the tail end of the film strip because it is still open or in its large diameter form, as previously described. Thereafter, cam rollers 727 and 729 engage cams (not shown) which urge them up above the surface of the conveyor 6. This rotates the shafts 728 and 730 to close the chucks 716 and 717 which engage the outer periphery of the cover and urge it into a more closed configuration. As the unit 7 moves to the succeeding step (*h*) the cover 4 is held closed by the chucks 716 and 717.

In step (*h*) the end caps 1 and 2 are fitted over the open ends of the cover 4.

When the unit 7 enters step (*h*) the cam rollers 726 and 721 engage cams (not shown), and move the cappers 713 and 719 towards the cover 4. At this time the caps 1 and 2 attached to the rotary shaft 711 and the winding shaft 712, respectively, are pushed towards the ends of the shafts and are finally fitted over the open ends of the pinched cover. The cam rollers 726, 721, 727 and 729 are thereafter released, whereby the chucks 716 and 717 are returned to their original open state by the spring 731. This releases the cover which slightly expands to securely engage the caps 1 and 2, whereby the wound film strip 5 is entirely enclosed within the completed magazine, which is then conveyed to and removed at the succeeding step (*i*).

When the unit 7 arrives at step (*i*) the cam roller 725 moves to the left along the X-axis whereby the winding shaft 712 becomes disengaged from the end of the spool 3. The finished magazine is thus released, and falls freely into a collector box (not shown) when the unit 7 turns under the end of the conveyor 6.

As described above, all of the steps from (*a*) to (*i*) are completed or implemented during the continuous transportation or movement of the workpieces, and the apparatus may therefore be operated at a much higher speed than the prior art apparatusses, wherein the various operations are intermittently performed at stationary positions.

Further, since all of the work steps are performed on the same axis, the positioning of the various pieces and components is more easily accomplished and sufficient precision may be obtained despite the greatly increased production speed of the apparatus, which is more than twice that of a conventional system.

The present invention is not limited to the precise embodiment described above, but various modifications may easily be made. For example, the cover 4 may be supplied to the unit 7 in any of steps (*a*)-(*e*), and the spool 3 may be rotationally aligned in step (*c*) to thus eliminate step (*d*). The conveying means is also not limited to an endless conveyor belt 6, but other well known conveying devices may be used, and the conveying direction is not limited to just a vertical or horizontal direction. The winding of the film strip 5 onto the spool 3 may also be accomplished by an individual motor. In addition, it should be understood that known means for attaching and removing the workpiece from the apparatus, means for detecting the completion of each step, etc., may be employed. It will further be noted that an apparatus for automatically assembling unwound or unloaded film magazines can be realized by simply omitting steps (*d*), (*e*) and (*f*).

We claim:

1. A method for roll loading a precut strip of photographic film into a magazine and simultaneously assembling the latter from a spool having an axial slot therein for receiving an end of the film strip, a slotted cylindrical shell adapted to be concentrically disposed around the spool, and a pair of opposite end caps adapted to be disposed over the spool ends and to engage the ends of the shell, characterized by the steps of:

(a) inserting the leading end of the film strip into the spool slot, (b) rotating the spool to wind the film strip thereon until only a predetermined tail end length of the film strip remains unwound and extending outwardly from the spool, (c) axially moving the shell over the wound spool to concentrically surround the spool with the tail end of the film strip extending through the shell slot, (d) squeeze engaging the shell to close the slot therein and reduce the shell diameter, (e) axially moving the end caps toward each other, over the ends of the spool, and into contact engagement with the ends of the shell, and (f) releasing the shell to enable it to diametrically expand into locking engagement with the end caps, (g) all of the above steps being carried out during the continuous movement of the film, spool, end caps and shell in the same direction and with the spool, end caps and shell continuously maintained in axial alignment.

2. An apparatus for roll loading a precut strip of photographic film into a magazine and simultaneously assembling the latter from a spool having an axial slot therein for receiving an end of the film strip, a slotted cylindrical shell adapted to be concentrically disposed around the spool, and a pair of opposite end caps adapted to be disposed over the spool ends and to engage the ends of the shell, said spool, shell and end caps being continuously maintained in axial alignment, said apparatus characterized by:

(a) means for inserting the leading end of the film strip into the spool slot, (b) means for rotating the spool to wind the film strip thereon until only a predetermined tail end length of the film remains unwound and extending outwardly from the spool, (c) means for axially moving the shell over the wound spool to concentrically surround the spool with the tail end of the film strip extending through the shell slot, (d) means for squeeze engaging the shell to close the slot therein and reduce the shell diameter, (e) means for axially moving the end caps toward each other, over the ends of the spool, and into contact engagement with the ends of the shell, (f) means for releasing the shell to enable it to diametrically expand into locking engagement with the end caps, and (g) conveyor means mounting all of the means recited in sub-paragraphs (b)-(f), inclusive, for continuous movement in the same direction during their operation.

3. A plurality of roll loading and assembling apparatusses as defined in claim 2 mounted at spaced positions on said conveyor means in the direction of moement thereof.

4. An apparatus as defined in claim 3, wherein the film strip inserting means comprises a film feed chute cyclically moveable over a repeating path in synchronization with said conveyor means, registrable with a spool during a portion of each movement cycle, and including a pair of guide rollers and a pair of selectively energizable drive rollers for feeding said film strips.

* * * * *